Nov. 10, 1942.  A. L. FOX  2,301,266
METHOD AND MEANS FOR TRANSPOSING ELECTRICAL CONDUCTORS
Filed Oct. 20, 1939  2 Sheets-Sheet 1
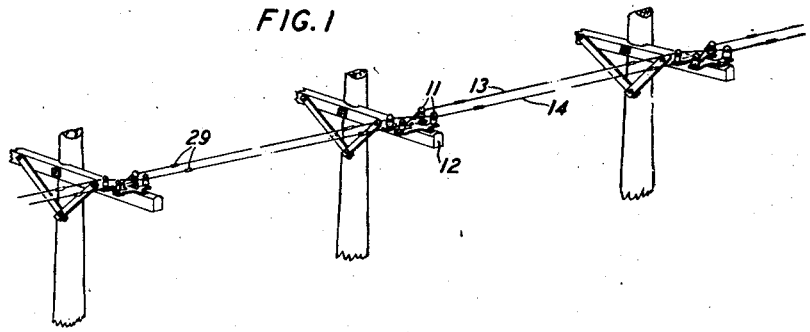
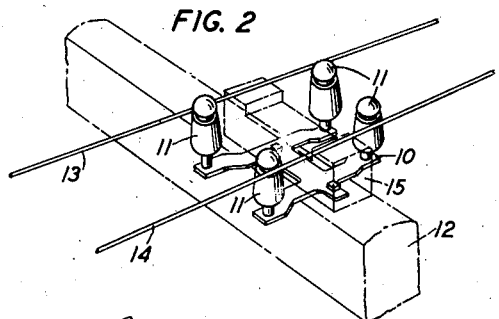
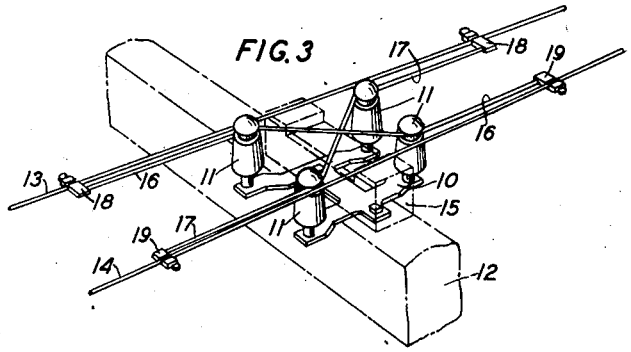
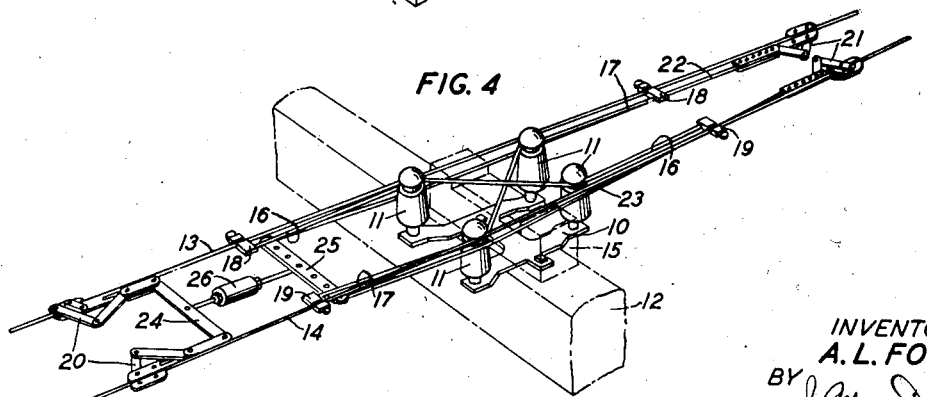
INVENTOR
A. L. FOX
BY J. MacDonald
ATTORNEY Nov. 10, 1942.  A. L. FOX  2,301,266
METHOD AND MEANS FOR TRANSPOSING ELECTRICAL CONDUCTORS
Filed Oct. 20, 1939  2 Sheets-Sheet 2
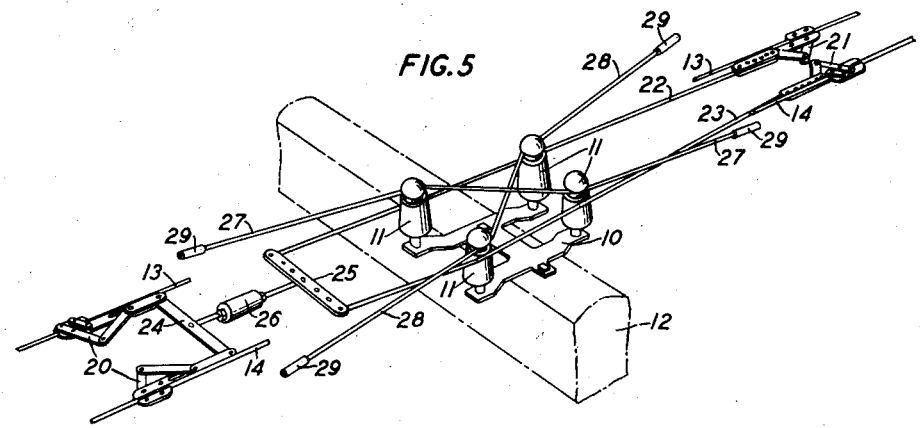
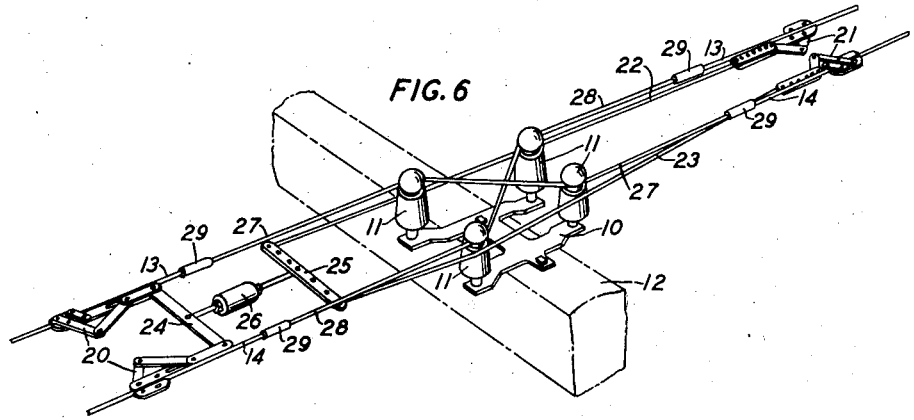
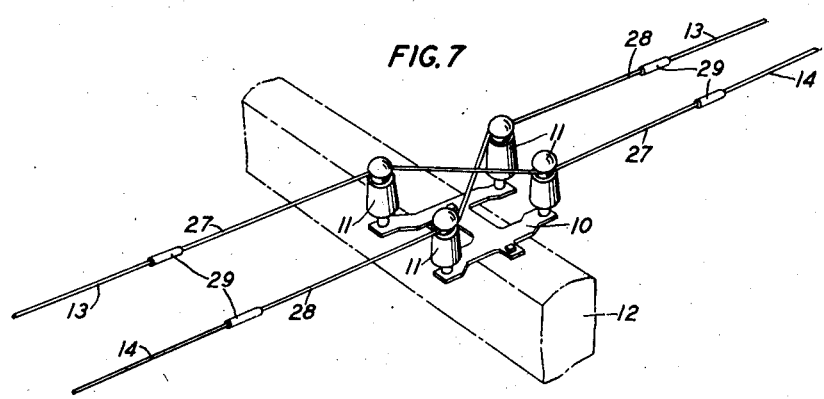
INVENTOR
A. L. FOX
BY
J. Mac Donald
ATTORNEY Patented Nov. 10, 1942

2,301,266

UNITED STATES PATENT OFFICE 2,301,266

METHOD AND MEANS FOR TRANSPOSING ELECTRICAL CONDUCTORS

Arthur L. Fox, Upper Montclair, N. J., assignor to Bell Telephone Laboratories, Incorporated, New York, N. Y., a corporation of New York Application October 20, 1939, Serial No. 300,348

4 Claims. (Cl. 174—33)

This invention relates to a method of transposing telephone line wires and its object is to provide a method which will overcome some of the difficulties met with at present.

The present practice in open wire carrier systems, for example, is to provide the necessary transposition of the wires of a pair by means of what is known as a point transposition, wherein the wires of a pair exchange pin positions at a bracket carrying four insulators within the space of approximately one foot.

The method of this invention overcomes the difficulties heretofore experienced of establishing sag equality between the wires of a pair and trouble due to broken wires and insulators at point transpositions.

By virtue of this invention the wires may be pulled over the cross-arms before any transpositions are made, thus reducing friction at the cross-arms and the wires may be readily tensioned in long sections in a single operation. It is very important that each wire of a pair of transmission wires, after transposition, be at substantially the same tension as the other wire of the pair.

The method of this invention involves raising the untransposed transmission wires at the transposition point and supporting them temporarily on a block at approximately the level they will occupy in the grooves in the insulators, measuring the lengths of the transmission wires to be cut out and replaced by wire inserts having high strength fatigue-resistance characteristics, by means of two lengths of wire placed in the grooves in diagonally related insulators and following the eventual position of the transposed wires, and secured to the opposite wires of the pair by clamps which establish the cutting points, holding the line wires beyond the cut-out points under tension, cutting out the portions of the wires between the clamps and substituting the high strength units for the measuring lengths. Thus there will be no change in the tension of the line wires after these units have been inserted. These units are preferably stranded wire.

During the operation of cutting out the sections of the line wire preparatory to inserting the high strength fatigue-resistance wire units, the tension in the line wires beyond the cuts is held, as stated, by some device, and for this purpose applicant employs two wire grips attached to the opposite ends of an equalizing yoke which in turn is connected from its center to a central point of a similar assembly through a take-up mechanism that can be operated so as to exert at all times the same tension in both wires and in both directions.

The invention will be more clearly understood from the following detailed description when read in connection with the attached drawings of which:

Fig. 1 is a fragmentary view in perspective of a portion of a completed transmission line installed in accordance with applicant's invention:

Fig. 2 is a fragmentary perspective view of a cross-arm and transposition bracket with the transmission wires in tension and supported adjacent the insulators by means of a block of wood;

Fig. 3 is a view similar to Fig. 2 except that measuring devices have been positioned around the insulators in the ultimate position of the transposed line wires and secured to the transmission wires:

Fig. 4 is a view similar to Fig. 3 except that adjustable wire gripping and tensioning means have been applied to the transmission wires on each side of the transposition bracket;

Fig. 5 is a view similar to Fig. 4 except that portions of the transmission wires have been cut out and the measuring devices have been replaced by wire link units which have sleeves thereon for connection to the transmission wires;

Fig. 6 is similar to Fig. 5, the stranded wire units having been joined to the ends of the transmission line wires; and Fig. 7 illustrates the completed transposed unit, the holding and tensioning mechanism having been removed.

As shown in Fig. 2, the first step in the installation of transmission line wires in accordance with this invention, after the usual bracket 10 with its insulators 11 mounted thereon has been secured to the cross-arm 12, is to position the untransposed wires 13 and 14 adjacent the insulators on the outside thereof with a suitable temporary support or block 15 under the wires between the insulators, and to apply the required initial tension thereto. Due to the fact that the support 15 is located at this point, no displacement will result.

It will be understood that although in Figs. 2 to 7 only a portion of a cross-arm is shown, the steps shown there are carried out on other cross-arms, the number of cross-arms depending on the number of spans, which in turn will be governed by that particular length of wire being installed. Therefore, a pair of wires may be initially tensioned over a considerable length. Suitable means (not shown) at each end of the lengths of wire are provided for holding the wire under tension while the transpositions are being thrown in.

After the wires 13 and 14 have been positioned, as shown in Fig. 2, suitable measuring devices 16 and 17, which comprise flexible lengths of wire having clamps 18 and 19 on the ends thereof, are positioned around and in the grooves of the insulators 11 and are secured to the wires 13 and 14 as shown in Fig. 3. Due to the cut-out portion in the block or support 15 these measuring devices will pass over each other and will assume substantially the same position as the permanent transposed wires. As shown in Fig. 4, a suitable device for holding the wires 13 and 14 under the proper tension when portions are cut out therefrom, is provided. This device comprises two pairs of wire grips 20 and 21 secured to two lengths of flexible cable or wires 22 and 23. It will be observed that the pair of grips 20 are not secured directly to the wires 22 and 23 but are connected together by means of a bar 24, the central portion of which is connected to an equalizing yoke 25 by means of a turnbuckle or take-up device 26. To the ends of the yoke 25 are secured the wires 22 and 23 which have located at their end portions the grips 21. By means of the turnbuckle 26 slack in the wires 22 and 23 is taken up until the proper tension is applied to the line wires 13 and 14. Due to the fact that the equalizing yoke 25 is located between the grips 20 and 21, both wires 13 and 14 will be under the same tension.

After the holding device has been secured in position and the proper tension applied as shown in Fig. 4, those portions of the transmission wires 13 and 14 lying between the clamps 18 and 19 of the measuring device are cut out. This is done by cutting the wires 13 and 14 close to the outside faces of the clamps. As shown in Fig. 5, the cut-out portions have been discarded and the measuring wires 16, 17, Figs. 3 and 4 have been replaced by the stranded link units 27 and 28. These units, as shown, occupy substantially the same position as the said measuring wires which were previously in this position. Therefore, the stranded links when secured to the wires 13 and 14, and when tension is released on the holding device, will be under the proper tension and will serve as a continuous unbroken length of wire.

The line wires 13 and 14 are secured in the sleeves 29 of the link units 27 and 28 as shown in Figs. 6 and 7 by means of a rolled sleeve joint which may be made in any suitable manner, for example, by means of the tool shown in Patent No. 1,896,512 to W. J. Hayford et al., issued February 7, 1933. The wire units can be supplied with the sleeves permanently attached to the ends thereof, said sleeves being either rolled, pressed or swaged for half their length. Provision should be made, either by accurately dimensioning the length of the wire units or by indenting the sleeves, so that the ends of the line wires when inserted in the sleeves will be positioned at predetermined distances apart. In measuring the section of line wire to be cut out, allowance should be made to take care of the stretch of the sleeve in rolling and the stretch of the strand under tension.

It will be readily apparent that the aforedescribed method of making transpositions not only provides a way of obtaining uniform tension in adjacent spans but provides a means for reinforcing the transmission line wires at their most vulnerable point.

While there is shown and described herein the preferred embodiment of my invention, it is to be understood that it is not limited or confined to the precise method herein disclosed as modifications and variations may be made therein without departing from the spirit of the invention, and that I am only limited by the scope of the appended claims.

What is claimed is:

1. An improved method of transposing a pair of line wires pulled in over the cross-arms which comprises positioning the wires at the level they will occupy in the insulator grooves, positioning between the wires at each cross-arm a bracket having mounted thereon in rectangular relation two pairs of insulators, each pair at a different level, applying an initial tension to the wires, placing a pair of measuring wires in the grooves of the diagonally opposed insulators and following the eventual transposition of the transposed line wires and securing the opposite ends of the measuring wires to the opposite line wires to establish the cutting points, maintaining tension in the line wires beyond said cutting points, cutting out portions of said line wires as determined by the measuring wires, substituting equal lengths of wire for the measuring wires, and removing the means for maintaining tension beyond the cutting points.

2. An improved method of transposing a pair of line wires pulled in over the cross-arms which comprises positioning the wires at the level they will occupy in the insulator grooves, positioning between the wires at each cross-arm a bracket having mounted thereon in rectangular relation two pairs of insulators, each pair at a different level, applying an initial tension to the wires, placing a pair of measuring wires in the grooves of the diagonally opposed insulators and following the eventual transposition of the transposed line wires and securing the opposite ends of the measuring wires to the opposite line wires to establish the cutting points, maintaining tension in the line wires beyond said cutting points, cutting out portions of said line wires as determined by the measuring wires, substituting equal lengths of stranded, high strength, fatigue-resistant wire for the measuring wires, and removing the means for maintaining tension beyond the cutting points.

3. An improved method of transposing a pair of line wires pulled in over the cross-arms which comprises positioning the wires at the level they will occupy in the insulator grooves, positioning between said wires at each cross-arm a bracket having mounted thereon in rectangular relation two pairs of insulators, each pair at a different level, applying an initial tension to the wires, placing a pair of measuring wires in the grooves of the diagonally opposed insulators and following the eventual transposition of the transposed line wires and securing the opposite ends of the measuring wires to the opposite line wires to establish the cutting points, maintaining tension in the line wires beyond said cutting points by attaching thereto wire grips in turn connected to the opposite ends of an equalizing yoke which is connected from its center to the central point of a similar assembly to a take-up mechanism operable to exert at all times the same tension in both wires and in both directions, cutting out portions of said line wires as determined by the measuring wires, substituting equal lengths of stranded, high strength, fatigue-resistant wire for the measuring wires, and removing the means for maintaining tension beyond the cutting points.

4. Method of transposing a pair of line wires pulled in over the cross-arms which comprises securing between the pair of wires on the cross-arms brackets having mounted thereon in rectangular relation four insulators, two at one level and two at another level, positioning a block on said bracket, positioning the wires on the blocks at the cross-arms at the level they will occupy in the grooves in the insulators, applying an initial tension to the wires, positioning around diagonally opposed insulators and securing the ends thereof to opposite wires of the pair of line wires, two measuring wires to establish the cutting points in the line wires, holding the tension in the line wires beyond the cutting points during the cutting out of the sections of line wire, cutting out sections of wire as determined by the measuring wires, inserting lengths of wire equal to those cut out crossing over each other in spaced relation and connecting them to opposite wires of the pair of line wires, and removing the tension applying means and the blocks.

ARTHUR L. FOX.